Nov. 20, 1956   J. R. FARRON   2,771,061
LATCHING MECHANISM FOR POSITIONING APPARATUS
Filed Sept. 14, 1953   3 Sheets-Sheet 2
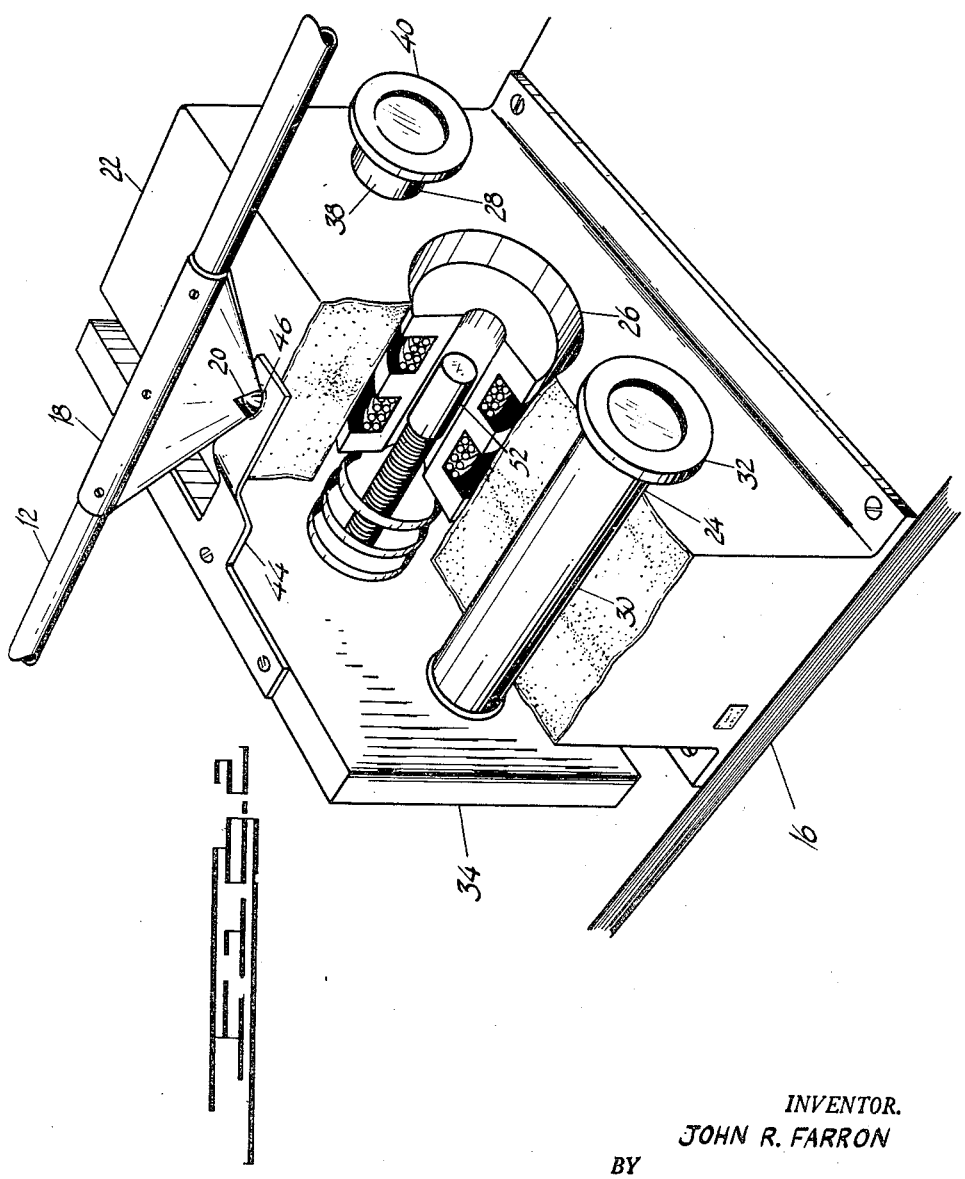
INVENTOR.
JOHN R. FARRON
BY
Ellsworth R. Roston
ATTORNEY Nov. 20, 1956  J. R. FARRON  2,771,061
LATCHING MECHANISM FOR POSITIONING APPARATUS
Filed Sept. 14, 1953  3 Sheets-Sheet 3
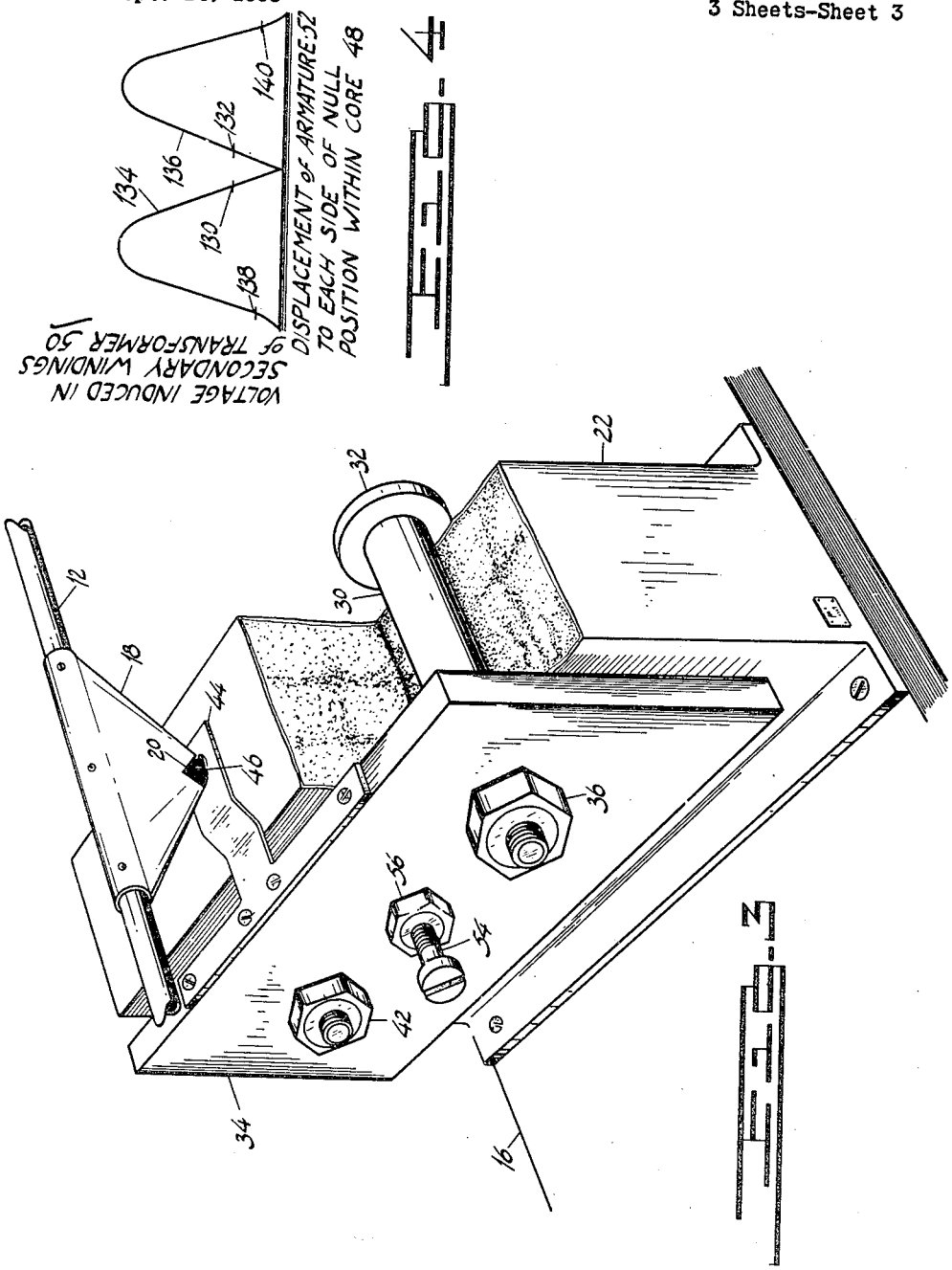
INVENTOR.
JOHN R. FARRON
BY
Ellsworth R. Roston
ATTORNEY

United States Patent Office 2,771,061
Patented Nov. 20, 1956

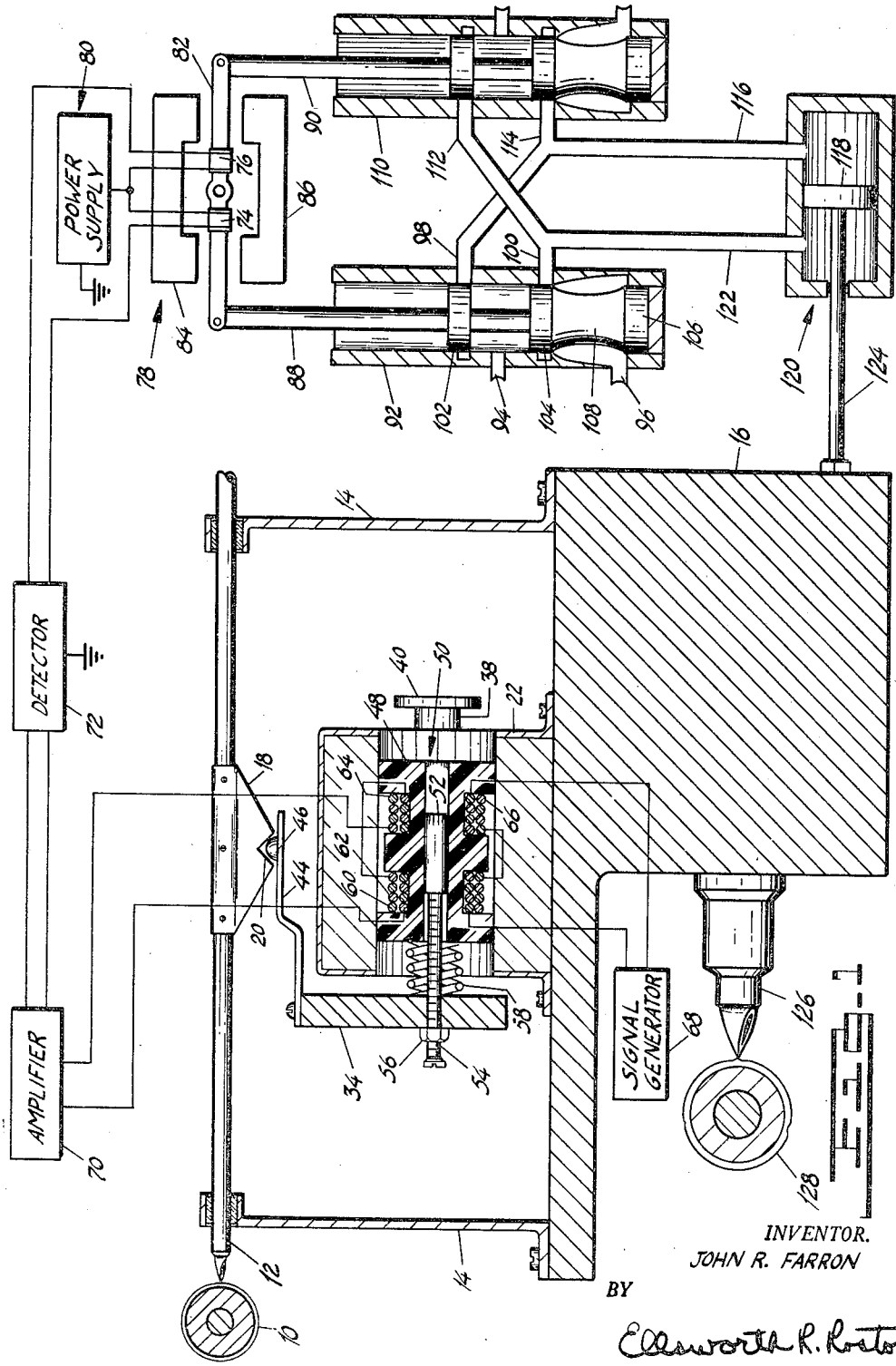

2,771,061

LATCHING MECHANISM FOR POSITIONING APPARATUS

John R. Farron, Oak Park, Mich., assignor to Bendix Aviation Corporation, Detroit, Mich., a corporation of Delaware Application September 14, 1953, Serial No. 379,926

8 Claims. (Cl. 121—41)

This invention relates to a system for controlling the movements of an output member in accordance with the movements of an input member, and more particularly to apparatus for controlling the movement of the output member in the event of any system failure.

In co-pending application, Serial No. 272,591, filed February 20, 1952, by Abraham M. Fuchs, a system is disclosed for positioning an output member in accordance with the movements of an input member. The system includes a transformer having an armature which is displaced by the input member to generate in the transformer a signal having an amplitude proportional to the displacement. This signal controls the application of a hydraulic force so that the force moves the output member in accordance with the signal amplitude. The output member is in turn coupled to the transformer windings and core for movement of the windings and core in a direction to minimize the signal induced in the transformer. By utilizing such a closed servomechanism loop, extreme accuracies are obtained in the movement of the output member. Because of such accuracies, the system is especially useful in guiding a tool head over a work piece in accordance with the movements of a master cam.

In the above system a signal is generated in the transformer only when the relative displacement between the armature and the core is maintained within predetermined limits. During normal operation, the output member moves in accordance with the movements of the input member and the relative displacement between the armature and the core never exceeds the signal generating limits of the transformer. It sometimes happens, however, that the tool head may accidently be jarred by some external force to displace the tool head and core beyond the limits of transformer operation. When this occurs, the transformer will no longer produce a signal and this system will cease to function. For example, a workman may accidently drop a wrench in the path of the tool head. This would hinder the movement of the tool head and the continued movement of the input member would displace the armature outside the limits of transformer operation. In a like manner, during system idleness, an unskilled workman may inadvertently bump into the tool head and displace the head and core so that the system will not function when it is turned on. It is therefore important that means be provided for maintaining the armature and core within predetermined limits even though the tool head may be displaced excessively.

Furthermore, it is important upon any system failure that the tool head be uncoupled from movement with the input member and that the signal produced after uncoupling be in a direction to move the tool head away from the work piece so as to prevent damage to the tool head or work piece. Obviously, if a wrench were dropped in the path of tool head, any continued movement of the tool head towards the work piece in accordance with the movement of the input member could easily result in damage to both the tool head and work piece.

This invention provides apparatus for maintaining the relative displacement between the transformer armature and core within predetermined limits even though the output member may be unknowingly displaced through an excessive distance. The apparatus operates to couple the output member to the input member through the transformer during normal operation. Upon any system failure, the apparatus operates to uncouple the output member from the input member. This permits the output member to move independently with respect to the input member. At the same time that the output member becomes uncoupled from the input member, the armature is shifted relative to the core to provide for the production by the transformer of a signal which is operative to move the output member away from the work piece. Reference is made to Patent No. 2,674,232, issued April 6, 1954, to Avrel Mason, for prior art in this field.

An object of this invention is to provide apparatus for operating with a system which accurately positions an output member in accordance with the movements of an input member. Another object of this invention is to provide apparatus for use in conjunction with the positioning system disclosed above to uncouple the output member from the input member in the event of any system failure.

A further object is to provide apparatus of the above character for producing an operable signal at all times even when the output member is uncoupled from the input member as a result of any system failure.

Still another object is to provide apparatus of the above character for producing a signal which is operative to move a tool head independently from an input member and in a direction away from a work piece in the event of any failure in the positioning system.

Other objects and advantages will be apparent from a detailed description of the invention and from the appended drawings and claims.

In the drawings:

Figure 1 is a schematic diagram, partly in block form and partly in section, illustrating one embodiment of apparatus for positioning an output member in accordance with the movements of an input member;

Figure 2 is an enlarged perspective view, partly broken away, of certain components shown in Figure 1 and illustrates these components in further detail;

Figure 3 is an enlarged perspective view, partly broken away, of certain components shown in Figures 1 and 2 as seen from a different angle than that shown in Figure 2; and Figure 4 is a diagram of curves illustrating the operation of certain electrical components shown in Figure 1.

In one embodiment of the invention, a cam 10 positions an input member such as a drive rod 12 slidably mounted on uprights 14 which extend from an output member such as a tool head 16. A detent 18 having a notch 20 is attached to the drive rod 12 for movement with the rod.

Extending up from the tool head 16 at an intermediate interval between the upright 14 is a housing 22. The housing 22 is provided with three axial holes 24, 26 and 28. A cylindrical shaft 30 is slidably disposed within the hole 24. The right end of the shaft 30 is provided with a flange 32 and the left end of the shaft extends through a hole provided in a plate 34. A nut 36 secures the shaft 30 to the plate 34. In a like manner, a cylindrical shaft 38 is disposed within the hole 28. The shaft 38 has a flange 40 at its right end and its left end extends through a hole in the plate 34 for fastening by a nut 42. Screwed to the top of the plate 34 is one end of a flexible leaf spring 44. A lug 46 is secured as by solder to the right end of the spring 44 for engagement with the notch 20 in the detent 18.

Fixedly positioned within the axial hole 26 in the housing 22 is a non-magnetic core 48 of a transformer generally indicated at 50. An armature 52 made of a suitable magnetic material is slidably positioned within the core 48. The left end of the armature 52 is connected to an adjustable screw 54 which extends through the plate 34. The screw 54 is held firmly to the plate 34 by means of a nut 56. By loosening the nut 56, the screw may be turned to adjust the position of the armature 52 relative to the core 48. A helical spring 58 which surrounds the screw 54 is connected under tension between the plate 34 and the core 48.

A primary winding 60 and a secondary winding 62 are interleaved on the left side of the core 48, and a primary winding 64 and a secondary winding 66 are interleaved in a similar manner on the right side of the core. The windings 60 and 62 are similar to the windings 64 and 66, respectively. The inner terminals of the primary windings 60 and 64 are connected to each other and the outer terminals are connected to a signal generator 68. Connections are made from the inner terminal of the secondary winding 62 to the outer terminal of the secondary winding 66 and from the outer terminal of the winding 62 and the inner terminal of the winding 66 to the input terminals of an amplifier 70. The output from the amplifier 70 is introduced to a detector 72 which has its output applied either directly or through amplifiers (not shown) to the outer terminals of a pair of windings 74 and 76 forming part of a torque motor, generally indicated at 78.

The inner terminals of the windings 74 and 76 are connected to an output terminal of a direct power supply 80. The windings 74 and 76 are disposed on opposite legs of an armature 82 pivotable on a centrally disposed pin. The armature 82 is made from a suitably magnetic material and is separated by relatively small air gaps from oppositely disposed yokes 84 and 86 forming part of a horseshoe magnet (not fully shown).

Pistons 88 and 90 are pivotably supported on the outer ends of the armature 82. The piston 88 is slidable in a sleeve 92 having an inlet conduit 94, an outlet conduit 96 and connecting conduits 98 and 100. Spools 102, 104, and 106 are provided on the piston 88 adjacent the conduits 98, 100 and 96, respectively. The spools 104 and 106 are connected by a portion 108 having a curved indentation, as fully disclosed in co-pending application Serial No. 222,591 filed April 24, 1951, by Shih-Hing Lee.

The curved indentation of the connecting portion 108 is provided to compensate for the force opposing the opening of the valve, so that the valve will be operated upon the application of a relatively small torque from the armature 82. The force opposing the opening of the valve is produced between the conduit 98 and the spool 102 as the spool moves away from its position blocking the conduit.

In like manner, the piston 90 is provided with spools corresponding to the spools 102, 104 and 106, respectively, and is slidable in a sleeve 110 similar to the sleeve 92. The sleeve 110 is provided with inlet and outlet conduits corresponding to the conduits 94 and 96, respectively, and with connecting conduits 112 and 114 similar to the conduits 98 and 100, respectively.

The conduit 98 communicates with the conduit 114 to form a channel 116 leading to the right side of a piston 118 in a ram, generally indicated at 120. Similarly, the conduits 100 and 112 communicate with each other to form a channel 122 leading to the left side of the piston 118. The piston 118 is fastened to a rod 124 adapted to drive an output member such as the head 16 of a tool (not shown). The head 16 carries a cutter 126 for producing on the face of a work piece 128 a pattern determined by the movements of the head.

In its neutral position, the armature 52 is so positioned relative to the secondary windings 62 and 66 that voltages of equal magnitude are induced in the windings by the current flowing through the primary windings from the signal generator 68. Since the voltages induced in the secondary windings have opposite polarities, they are canceled when introduced to the amplifier 70. When the armature 52 is displaced from its intermediate or null position, voltages of unequal magnitude and opposite polarity are induced in the windings 62 and 66, and the difference between these voltages is amplified and detected.

For relatively small displacements of the armature 52 to either side of its null position, the output voltage produced by the amplifier 70 is substantially proportional to the armature displacement. This results from the symmetrical disposition of the windings 60, 62, 64 and 66 on the non-magnetic core 48. For example, in one model that has been used, the relationship between the output signal and the armature displacement is substantially linear for displacements up to 80 mils from either side of the null position. In other models, a substantially linear relationship exists for even greater displacements but the deviation from true linearity is slightly greater than the model disclosed above. The substantially linear portions of the curves of transformer response versus armature displacement are illustrated at 130 and 132 in Figure 4 for armature displacements to either side of the null position.

As the armature continues to move beyond the region of linear response, the output signal increases for a time at a non-linear rate, as indicated at 134 and 136 in Figure 4. For even greater displacements of the armature 52, the amplitude of the output signal starts to decline because the magnetic coupling between the armature and the windings decreases. The portions of the response curves illustrating the decline of the output signals are illustrated at 138 and 140 in Figure 4. At relatively great displacements of the armature 52 to either side of its null position, the amplitude of the output signal generated by the transformer 50 actually declines to zero.

The transformer 50 ordinarily operates in the region of linear response. After being amplified and detected, the output signal is applied as proportionate direct currents to the windings 74 and 76. A positive current flows through one winding from the detector 72, and a negative current of equal magnitude flows through the other winding from the detector. The positive current through the first winding aids the current flowing through the winding from the power supply 80, but the negative current through the other winding opposes the current from the power supply. The resultant unbalance of the currents through the windings causes the armature 82 to be pivoted in a direction and through an angle determined by the unbalance.

When the armature 82 pivots in a clockwise direction, it moves the piston 88 upwardly and the piston 90 downwardly. The upward movement of the piston 88 causes the spools 102 and 104 to move away from their positions blocking the conduits 98 and 100, respectively. As a result, a continuous circuit is established which includes the inlet conduit 94, the connecting conduit 98, the channel 116, the ram 120, the channel 122, the connecting conduit 100 and the outlet conduit 96. The fluid flowing through the continuous circuit acts upon the piston 118 in the ram 120 to move the piston to the left. The rate at which the piston 118 moves at any instant is determined by the distance through which the piston 88 has moved upwardly at that instant, since this distance controls the amount of fluid flowing through the ram 120. Similarly, the piston 118 moves to the right when the armature 82 is pivoted in a counterclockwise direction.

When the piston 118 moves to the left or right in Figure 1, it produces a corresponding movement of the tool head 16 and the cutter 126 so that the cutter cuts the work piece 128 in a pattern determined by the movements of the cam 10. The tool head 16 also drives the housing 22 and the windings of the transformer 50 in a direction to minimize the output signal induced in the transformer. In this way, the movements of the cutter 126 relative to the work piece 128 are controlled by a closed servomechanism loop which is always operating to reduce to zero the relative displacement between the armature 52 and the core 48. Because of the closed servomechanism loop, the relative displacement between the armature and the core is always in the order of a mil or less during the cutting operation, even though the cutter 126 may be moving as much as several inches from its neutral position.

As previously disclosed, the output signal from the transformer 50 actually declines to zero if the armature 52 becomes considerably displaced from its neutral position. If the armature should be so displaced, no signal would be produced in the system to move the core 48 and the windings on the core in a direction to restore the armature to an intermediate position within the core. Such a displacement would not ordinarily occur during the cutting operation on the work piece 128. However, it might occur if an object such as a wrench is accidently dropped into the path of the tool head. It might also occur during the time that the positioning apparatus is idle if a worker bumped into the tool head 16.

This invention provides appartaus for maintaining the relative displacement between the armature 52 and the core 48 within the signal generating range of the transformer at all times. For relative displacements in which an output signal is produced by the transformer, the lug 46 on the leaf spring 44 remains positioned within the notch 20 on the detent 18. As the input rod 12 moves the detent 18, the lug 46 and the leaf spring 44 move with the detent. Since the plate 34 is connected to the leaf spring 44, the plate and the armature 52 which is connected to the plate also move with the detent 18 so as to displace the armature relative to the core 48. The output signal thus produced in the transformer operates to move the tool head in accordance with the movements of the input rod 12 and in a direction to reduce the relative displacement between the core 48 and the armature 52.

However, should the tool head 16 become excessively displaced for reasons previously disclosed, the lug 46 is disengaged from the notch 20 in the detent 18. For example, if the tool head 16 is displaced to the right, at a signal corresponding to the output signal illustrated at 138 in Figure 4, the housing 22 presses against the inner surfaces of the flanges 32 and 40 on the cylindrical shafts 30 and 38, respectively. As the tool head and the housing 22 continue to move to the right, the cylindrical shafts move with the housing. Since the plate 34 is secured to the cylindrical shafts, it also moves with the housing and causes the lug 46 to slide out of the notch 20.

Upon a movement of the lug 46 out of the notch 20, the coil spring 58 pulls the plate 34 against the housing 22. This causes the armature 52 to be shifted to the right side of its null position relative to the core 48 to produce in the transformer 50 a signal which corresponds to the output signal illustrated at 140. The coil spring 58 operates to maintain the plate 34 against the housing 22 and the signal produced remains constant at 140 to move the tool head to the right and away from the work piece. When this occurs, the tool head will no longer move in accordance with the movements of the input 12 until the tool head is manually moved to the left to position the lug 46 within the notch 20 for normal operation.

Similarly, the lug 46 will become disengaged from the notch 20 when the tool head and the housing are displaced a great distance to the left relative to the armature 52. Upon such an occurrence, the housing 22 will press against the plate at a signal corresponding to 140. As the tool head and housing continue to move to the left, the plate 34 will move with the housing to slide the lug 46 out of the notch 20 in an opposite direction to that disclosed when the tool head is displaced to the right. Upon such a disengagement, the coil spring 58 acts to hold the plate against the housing 22. The armature 52 is then maintained to the right of its null position within the core 48 to produce a signal corresponding to 140 which is operative to move the tool head to the right and away from the work piece so as to prevent any damage to the work piece.

It is to be noted that whether the tool head 16 is displaced excessively to the right or to the left to produce a disengagement of the lug 46 from the notch 20 in the detent 18, the coil spring 58 operates to position the plate 34 against the housing 22 to generate in the transformer 50 a unidirectional signal corresponding to 140 which operates to move the tool head away from the work piece. In this way, damage that may result to the tool head or the work piece upon a failure in the system is prevented.

The apparatus provided is simple, compact, and reliable in its operation. During normal operation of the positioning system, the displacement between the armature 52 and the core 48 is generally not greater than a mil. Therefore, the transformer 50 operates in its linear range corresponding to output signals illustrated at 130 and 132 and the tool head accurately follows the movements of the input rod 12. Upon any failure in the system however, the apparatus is operative to free the tool head from further movements with the input rod. The apparatus is also operative to position the armature 52 relative to the windings on the core 48 so that a signal will be produced to move the tool head 16 away from the work piece 128. Consequently, there is provided effective safety apparatus for use in conjunction with a positioning system to prevent damage to certain components in the system when any failure occurs.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, input means, a motion sensor including first and second members movable relative to each other from a null position to generate a signal, means on the first member of the motion sensor to prevent a relative displacement between the first and second members of more than a predetermined magnitude within the signal generating limits of the sensor, means for providing a cooperative coupling between the input means and the first member of the motion sensor for movement of the first member in accordance with the movements of the input means, output means connected to the second member of the motion sensor for movement of the second member in accordance with the signal generated by the motion sensor, means operative upon the predetermined relative displacement between the first and second members of the motion sensor to actuate the coupling means for a free movement of the input means relative to the first member, and means operative upon actuation of the coupling means to position the first member to one side of its null position relative to the second member to produce a signal in the sensor for moving the output means in the direction of disposition of the first member.

2. In combination, a cam, input means for following the displacement of the cam, a motion sensor including first and second members movable relative to each other from a null position to generate a signal, means for providing a cooperative engagement between the input means and the first member of the motion sensor for producing relative movements between the first and second members, output means connected to the second member of the motion sensor and operative upon introduction of the signal generated by the sensor to move the second member in a direction to minimize the signal, means operative upon a predetermined relative displacement between the first and second members of the motion sensor within the signal generating limits of the sensor to actuate the engaging means for the disengagement of the first member from the input means, and restraining means connected between the first and second members and operative upon the actuation of the engaging means for a displacement of the first member relative to the second member in a direction away from the cam to produce a displacement of the second member in a direction away from the cam and within the signal generating limits of the motion sensor.

3. In combination, a cam, a motion sensor including first and second members movable relative to each other within predetermined limits to generate an operable signal, input means responsive to displacements of the cam, latching means adapted to be driven by the input means, means adapted to be driven by the latching means and to drive the first member of the motion sensor in accordance with the movements of the input means, output means connected to the second member in the motion sensor and operative upon introduction of the signal generated by the motion sensor to move the second member in accordance with the movements of the input means, means for disengaging the latching means upon a relative movement of the predetermined magnitude between the first and second members to free the first member from movement with the input means, and restraining means connected between the first and second members of the motion sensor and operative upon a displacement of the predetermined magnitude of the first member relative to the second member in the direction of the cam to produce a movement of the first member in a direction away from the cam and through a distance within the signal generating limits of the motion sensor.

4. In combination, a cam, a motion sensor including first and second members movable relative to each other through a first range from a null position to generate a signal having an amplitude proportional to the relative movement, input means adapted to follow the displacement of the cam, detent means on the input means, latching means on the first member of the motion sensor for engaging the detent means for relative displacements of a predetermined magnitude between the first and second members including the first range and within the signal generating limits of the motion sensor to provide a movement of the first member with the input means, output means operative to become displaced in accordance with the signal generated by the motion sensor and to produce a corresponding displacement of the second member in the motion sensor in a direction to minimize the signal, means for disengaging the latching means from the detent means upon a relative movement of the predetermined magnitude between the first and second members of the motion sensor to provide a free movement between the input and output means, and tension means associated with the first and second members of the motion sensor to provide for a displacement of the first member in a direction away from the cam relative to the second member and through a distance within the signal generating limits of the motion sensor.

5. In combination, a cam, a motion sensor including first and second members movable relative to each other to generate a signal within predetermined relative displacements between the members, input means for following the displacement of the cam, detent means connected to the input means for movement with the input means, a leaf spring connected to the first member of the motion sensor and adapted to engage the detent means for relative movements between the first and second members of the motion sensor within the predetermined magnitude, output means adapted upon introduction of the signal generated by the motion sensor to move the second member of the motion sensor in a direction to minimize the signal, means for disengaging the leaf spring from the detent means upon a relative movement of the predetermined magnitude between the first and second members in the motion sensor to provide for a free movement between the first and second members, and a spring connected between the first and second members of the motion sensor and operative upon disengagement of the leaf spring from the detent means to dispose the first member of the motion sensor in a position away from the cam relative to the second member in the sensor and within the signal generating limits of the sensor.

6. In combination, a cam, a motion sensor including first and second members movable relative to each other through a first range from a null position to generate a signal having an amplitude proportional to the relative movement, input means for following the displacement of the cam, detent means having a recess portion and adapted to become displaced with the input means, a leaf spring connected to the first member of the motion sensor, a lug connected to the leaf spring and positioned within the recess portion of the detent means for relative movements between the first and second members of the motion sensor of a predetermined magnitude including the first range and within the signal generating limits of the sensor, output means connected to the second member of the motion sensor and operative upon introduction of the signal generated by the sensor to move the second member in a direction to minimize the signal, means operative upon a relative displacement of the predetermined magnitude between the first and second members of the motion sensor to disengage the lug from the recess portion of the detent means, and a spring connected between the first and second members of the motion sensor and operative upon disengagement of the lug from the recess portion of the detent means to position the first member in a direction away from the cam relative to the second member and within the signal generating limits of the motion sensor.

7. In combination, a motion sensor including first and second members movable relative to each other from a null position to generate a signal, a flange on the first member of the motion sensor for engaging the second member to prevent a relative displacement between the first and second members of more than a predetermined magnitude within the signal generating limits of the sensor, a cam, input means for following the displacement of the cam and for engaging the first member of the motion sensor for relative displacements between the first and second members of less than the predetermined magnitude, output means connected to the second member of the motion sensor and operative to move the second member in a direction to minimize the signal produced by the motion sensor, means operative upon a relative displacement of the predetermined magnitude between the first and second members of the motion sensor to disengage the input means from the first member of the motion sensor, and a coil spring connected between the first and second members of the motion sensor and operative upon disengagement of the input means from the first member to position the first member of the motion sensor away from the cam relative to the second member in the sensor and within the signal generating limits of the sensor.

8. In combination, a cam, input means for following the displacement of the cam, a motion sensor including first and second members movable relative to each other through a first range from a null position to generate a signal having an amplitude proportional to their relative movements, detent means connected to the input means and having a recess portion, a leaf spring connected to the first member of the motion sensor, a lug on the leaf spring and positioned within the recess portion of the detent means for movement of the first member of the motion sensor in accordance with the movements of the input means, output means connected to the second member and operative upon introduction of the signal from the sensor to move the second member in a direction to minimize the signal, means including a flanged shaft connected to the first member for engaging the second member upon a relative displacement between the first and second members of a predetermined magnitude greater than the first range and within the signal generating limits of the sensor to disengage the lug from the recess portion of the detent means, and means including a spring disposed between the first and second members and a plate connected to the first member and operative upon disengagement of the lug from the recess portion of the detent means to position the first member away from the cam to one side of its null position relative to the second member and within the signal generating limits of the sensor.

References Cited in the file of this patent
UNITED STATES PATENTS 2,674,232    Mason ------------------ Apr. 6, 1954